Patented June 2, 1925.

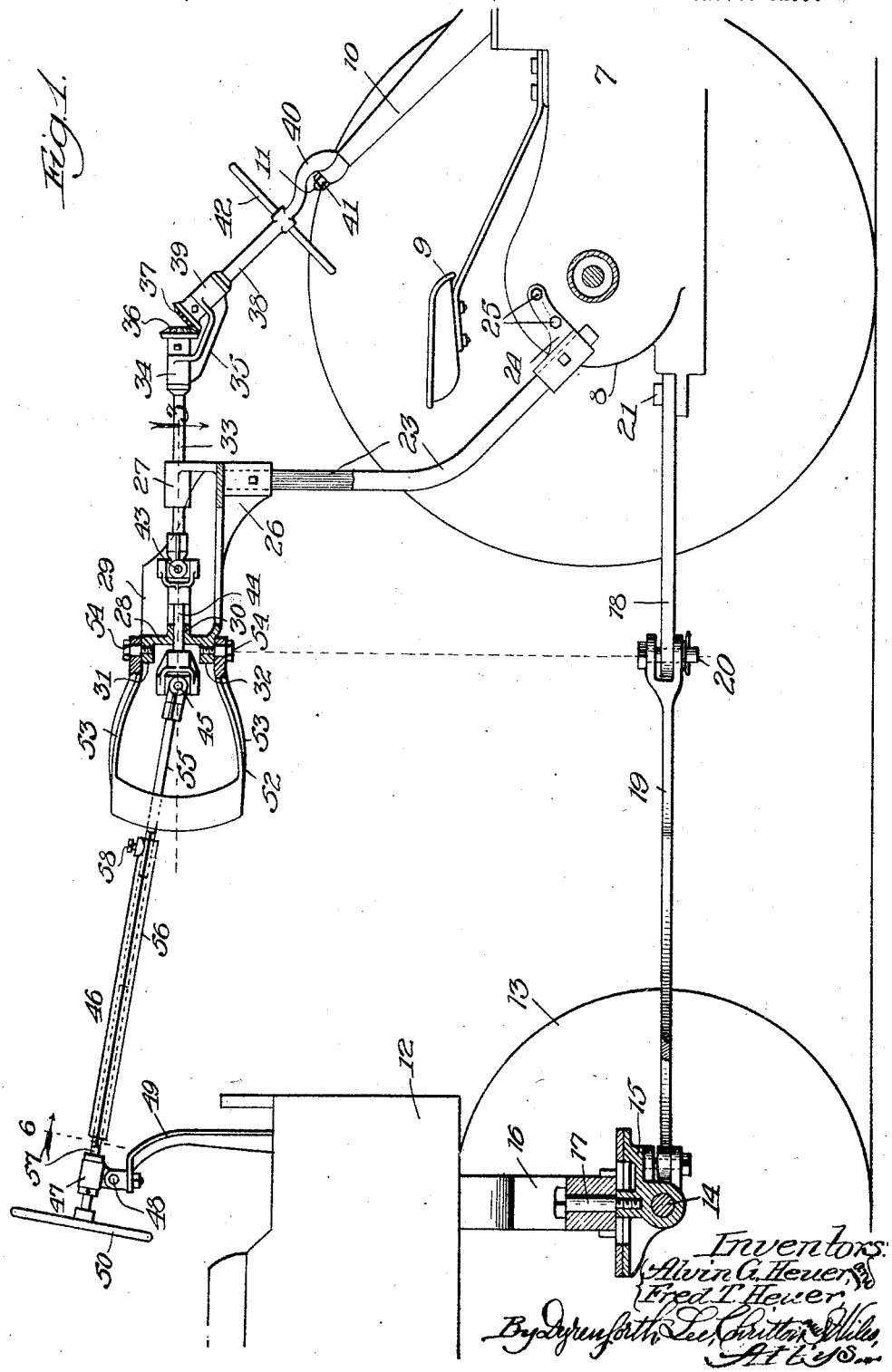

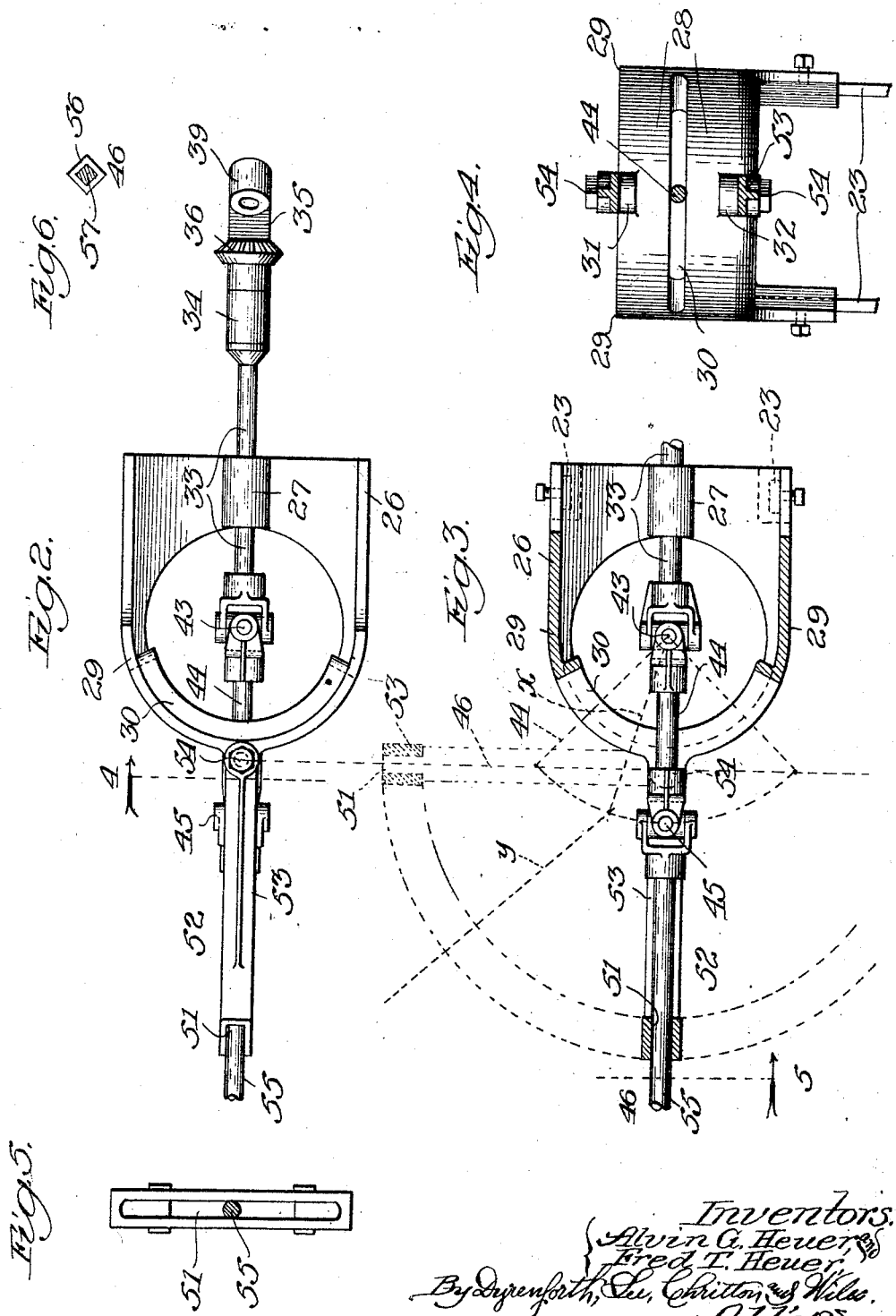

1,540,472

UNITED STATES PATENT OFFICE.

ALVIN G. HEUER AND FRED T. HEUER, OF BUREAU TOWNSHIP, BUREAU COUNTY, ILLINOIS.

STEERING MECHANISM FOR TRAILERS.

Application filed July 18, 1923. Serial No. 652,339.

*To all whom it may concern:*

Be it known that we, ALVIN G. HEUER and FRED T. HEUER, citizens of the United States, residing in Bureau Township, in the county of Bureau and State of Illinois, have invented a new and useful Improvement in Steering Mechanism for Trailers, of which the following is a specification.

Our invention relates more particularly to steering mechanism for trailers, more especially agricultural implements such as reapers, etc., drawn by power-driven tractors, the steering mechanism being provided for the purpose of affording, to the person riding on the trailer, means whereby the tractor may be steered as desired.

Our primary objects are to provide a novel, simple, positive and durable construction of steering mechanism for the general purpose above set forth; to provide a construction of steering mechanism whereby the tractor and trailer may be permitted to turn about a comparatively short radius even so sharp that the axle of the trailer is parallel with the longitudinal axis of the tractor, without impairing the steering connections between the tractor and trailer and without disturbing the operative positions of the cooperating part thereof; to provide for the ready disconnecting of the trailer from the tractor, at the steering mechanism, and the ready coupling together thereof; to provide a construction of steering mechanism whereby it may be readily attached to the steering post of the tractor and readily removed therefrom when desired; to provide means whereby the coupled vehicles may be steered from either or both thereof as desired; and generally to so improve upon mechanism of the character above stated and as heretofore provided, that it will be better adapted to perform the functions for which it is provided.

Referring to the accompanying drawings:

Figure 1 is a view in side elevation of the rear and front portions, respectively, of a Fordson tractor and a trailer to be drawn thereby, showing these vehicles connected together by draft mechanism and by steering mechanism, the latter constructed in accordance with our invention, certain of the parts of the structure illustrated being shown in section. Figure 2 is a plan view, enlarged, of a portion of the steering mechanism. Figure 3 is a similar view, with certain parts sectioned, the section being taken at the line 3 on Fig. 1 and viewed in the direction of the arrow. Figure 4 is a section taken at the line 4 on Fig. 2 and viewed in the direction of the arrow. Figure 5 is a section taken at the line 5 on Fig. 3 and viewed in the direction of the arrow; and Figure 6, a section taken at the line 6 on Fig. 1 and viewed in the direction of the arrow.

The rear end of a tractor in connection with which our steering mechanism is illustrated, is represented at 7, this tractor being shown as of the well known Fordson type, the differential housing thereof being shown at 8, the driver's seat, supported on the frame, at 9, and the steering post in the column being represented at 11.

The front end of a trailer to be drawn by the tractor 7 is represented at 12, the front wheels of which, one thereof being represented at 13, are mounted on an axle 14 extending through the fifth wheel 15 which is pivoted, on a vertical axis, to the frame 16 of the trailer, as represented at 17, this frame resting upon the fifth wheel 15. The draft connection between the two vehicles is shown as formed of two links 18 and 19 pivotally connected together at 20, the link 18 being rigidly connected with the differential housing 8, as indicated at 21, and the link 19 to the axle 14 preferably as tongues are commonly connected with axles.

Referring now to the steering mechanism, whereby the steering wheels (not shown) of the tractor may be turned, for steering purposes, by a person riding the trailer 12, the mechanism shown comprises a supporting bracket arm 23 of general angle-shape, which is secured at its lower end in a clip 24 secured to a side of the differential housing 8, as by the bolts represented at 25 and commonly provided in the housing of the tractor, this arm carrying, at its upper end, a bracket head 26 presenting at one end a bearing 27. The head 26 is of general hollow form, to present an end wall 28 and side walls 29, the wall 28 being of arc shape in plan and containing a horizontally-disposed slot 30 disposed in the same horizontal plane as the bearing 27, the upper and lower edges of the wall 28 being provided with rearwardly-extending bosses 31 and 32 for a purpose hereinafter described.

The bearing 27 forms a journal support for a shaft 33 the forward end of which is journaled in a bearing 34 in a bracket 35, this shaft being provided forwardly of the bracket with a bevel gear 36 which meshes with a bevel gear 37 rigidly secured to the upper end of an inclined shaft 38 journaled in a bearing 39 provided on the forward end of the bracket 35 and extending at an angle to the journal 34. The lower end of the shaft 38 is provided with a deflected portion 40 containing an aperture extending therethrough in axial alignment with the upper end of the shaft 38 and of the same form as the aperture contained in the steering wheel as commonly provided as a part of the equipment of the Fordson tractor, adapting the shaft to be fitted to the upper end of the steering post 11, the steering wheel having been removed, and thereby provide operative steering connection between shaft 38 and the post 11, the shaft 38 being secured to the post, through the medium of the nut 41 screwed upon the upper end of the latter and against the upper surface of the apertured part of the bent portion 40 of the shaft. The shaft 38 also is provided with means whereby the steering post 11 may be rotated by a person occupying the seat 9, if desired, the particular means shown comprising a cross-bar 42 carried by the shaft 38.

The rear end of the shaft 33 is connected, by a universal joint 43, with the forward end of a shaft 44 located in the slot 30 and adapted to swing in the latter in a horizontal plane. The rear end of the shaft 44 is connected by a universal joint 45 with the forward end of a shaft 46 journaled at its rear end in a bearing 47 pivotally supported, as indicated at 48, on an upwardly-extending bracket 49 provided on the trailer 12, the rear end of the shaft 46 being provided with a steering wheel 50 which may be the steering wheel which is provided as a part of the standard equipment of the Fordson tractor. The shaft 46 extends through a vertically-disposed slot 51 in a rocking head 52 having forwardly-extending arms 53 spaced apart and straddling the bosses 31 and 32 to which these arms are pivotally connected, as through the medium of the pivoting studs 54 extending through these arms and screwing into the bosses 31 and 32, the pivots 54 being located between the universal joints.

The shaft 46 is preferably formed of three sections, 55, 56 and 57, the shaft section 56 being in the form of a sleeve with which the rear end of the shaft section 55 and the forward end of the shaft section 57 telescope, it being preferred that the portions just referred to of the shaft sections 55 and 57 be of angular shape, as, for example, square, in cross-section, and the aperture in the sleeve be correspondingly shaped as shown in Fig. 6 to insure the desired operative driving engagement between these shaft sections, the shaft section 56 being provided with a set-screw 58 adjacent its forward end for connecting it with the shaft section 55. The sleeve-section 56 and shaft section 57 are free to have movement relative to each other lengthwise thereof. The mechanism shown, as hereinbefore suggested, is adapted, more particularly, for application to a tractor of the Fordson type, and in applying it thereto, the steering wheel commonly provided as a part of the steering mechanism of the tractor would be first removed from the steering post 11 and the shaft 38 applied to the post to the position shown, and the nut 41 thereupon re-applied to the post, and, if desired, the steering wheel referred to may be used as the steering wheel 50 for the rear end of the shaft 57.

One of the principal features of our invention is the adaptability of the steering mechanism for operation even in the turning of the vehicles about a comparatively short radius and even where the axle of the trailer extends parallel with the longitudinal axis of the tractor, the arrangement of the parts of the structure, and including the universal joints and the guide-ways 30 and 51, permitting of such turning. In Fig. 3 the position occupied by the head 53 in such short turning is represented in dotted lines, as also the positions occupied by the shafts 44 and 46, the dotted angularly-disposed lines X and Y indicating the positions occupied by the shafts 44 and 46 in the turning of a less sharp corner, it being understood that by reason of the provision of the slot 30 through which the shaft 44 extends, this shaft and the bracket head 26 are adapted for relative movement in a horizontal plane and that by reason of the pivotal connection 54 between the heads 26 and 52, these heads are also adapted for relative movement in a horizontal plane.

By providing the vertical guide slot 51 the head 52 and the shaft 46 are capable of relative vertical movement, which is very desirable inasmuch as it permits of the tractor and trailer being operated over uneven ground without danger of impairing the parts of the steering mechanism and without interfering with the proper operation of the latter.

It often becomes desirable to disconnect the trailer from the tractor temporarily, and to avoid the necessity of disconnecting the steering mechanism as an entirety from either the tractor or the trailer, under such conditions, the sleeve portion 56 is provided with the set-screw connection which permits of the ready disconnecting of the shaft sections and the ready assembly thereof when it is desired to again operate the trailer.

The provision of the means on the shaft 38 whereby the tractor may be steered by an operator positioned on the tractor is of advantage inasmuch as it often becomes desirable to operate the tractor from this point.

While we have illustrated and described a particular construction embodying our invention, we do not wish to be understood as intending to limit it thereto as the same may be variously modified and altered without departing from the spirit of the invention.

What we claim as new, and desire to secure by Letters Patent, is:

1. The combination with a pulling vehicle having steering wheels, and a trailer, of steering mechanism for steering said pulling vehicle by a person on said trailer comprising rotatable shafts disposed in a longitudinal series, universal joints connecting said shafts together, and a head pivotally supported to swing in a substantially horizontal plane and containing a substantially vertically-disposed slot into which the one of said shafts which extends rearwardly from the rear universal, extends.

2. The combination with a pulling vehicle having steering wheels, and a trailer, of steering mechanism for steering said pulling vehicle by a person on said trailer comprising rotatable shafts disposed in a longitudinal series, universal joints connecting said shafts together, and a head pivotally supported at a point between said universals, adapting it to swing in a substantially horizontal plane, said head containing a substantially vertically-disposed slot into which the one of said shafts which extends rearwardly from the rear universal, extends.

3. The combination with a pulling vehicle having steering wheels, and a trailer, of steering mechanism for steering said pulling vehicle by a person on said trailer comprising rotatable shafts disposed in a longitudinal series, universal joints connecting said shafts together, a guide member on said pulling vehicle containing a substantially horizontally-disposed slot through which the intermediate one of said shafts extends, and a head pivotally supported on said guide member to swing in a substantially horizontal plane and containing a substantially vertically-disposed slot into which the one of said shafts which extends rearwardly from the rear universal, extends.

4. The combination with a pulling vehicle having steering wheels, and a trailer, of steering mechanism for steering said pulling vehicle by a person on said trailer comprising rotatable shafts disposed in a longitudinal series, universal joints connecting said shafts together, a guide member on said pulling vehicle containing a substantially horizontally-disposed slot through which the intermediate one of said shafts extends, and a head pivotally supported on said guide member at a point between said universals adapting said head to swing in a substantially horizontal plane, said head containing a substantially vertically-disposed guide slot into which the one of said shafts which extends rearwardly from the rear universal, extends.

5. The combination with a pulling vehicle having steering wheels, and a trailer, of steering mechanism for steering said pulling vehicle by a person on said trailer comprising rotatable shafts disposed in a longitudinal series, universal joints connecting said shafts together, a bearing on said pulling vehicle in which the forward one of said shafts is journaled, a guide member on said pulling vehicle containing a substantially horizontally-disposed slot through which the intermediate one of said shafts extends and in which the latter is movable in a substantially horizontal plane, the forward one of said universals being located between said bearing and said guide slot, and a head pivotally connected with said guide member at a point between said universals and adapted to swing in a substantially horizontal plane, said head containing a substantially vertically-disposed slot in which the rear one of said shafts is movable up and down.

6. The combination with a pulling vehicle having steering wheels, and a trailer, of steering mechanism for steering said pulling vehicle by a person on said trailer comprising rotatable shafts disposed in a longitudinal series, universal joints connecting said shafts together, and a head pivotally supported to swing in a substantially horizontal plane and with which the one of said shafts which extends rearwardly from the rear universal engages, the rear one of said universal joints being located between the pivot of said head and the part of said head engaged by the one of the said shafts which extends rearwardly from the rear universal.

7. The combination with a pulling vehicle having steering wheels, and a trailer, of steering mechanism for steering said pulling vehicle by a person on said trailer comprising rotatable shafts disposed in a longitudinal series, universal joints connecting said shafts together, and a head pivotally supported at a point between said universal joints and adapting it to swing in a substantially horizontal plane and with which the one of said shafts which extends rearwardly from the rear universal engages, the rear one of said universal joints being located between the pivot of said head and the part of said head engaged by the one of the said shafts which extends rearwardly from the rear universal.

ALVIN G. HEUER.
FRED T. HEUER.